(12) United States Patent
Hofstetter

(10) Patent No.: US 7,487,639 B2
(45) Date of Patent: Feb. 10, 2009

(54) METHOD AND CONTROL DEVICE FOR CONTROLLING A TURBOCHARGER HAVING A TURBINE-SIDE CHARGING PRESSURE CONTROL AND A CIRCULATING-AIR VALVE

(75) Inventor: Matthias Hofstetter, Ringsheim (DE)

(73) Assignee: Dr. Ing. h.c. F. Porsche Aktiengesellschaft, Weissach (DE)

( * ) Notice: Subject to any disclaimer, the term of this patent is extended or adjusted under 35 U.S.C. 154(b) by 41 days.

(21) Appl. No.: 11/598,018

(22) Filed: Nov. 13, 2006

(65) Prior Publication Data

US 2007/0107428 A1    May 17, 2007

(30) Foreign Application Priority Data

Nov. 14, 2005    (DE) .................. 10 2005 054 525

(51) Int. Cl.
- *F02B 33/44* (2006.01)
- *F02B 37/12* (2006.01)
- *F02B 37/16* (2006.01)
- *F02B 37/18* (2006.01)
- *F02B 37/24* (2006.01)

(52) U.S. Cl. ............................. 60/611; 60/602
(58) Field of Classification Search ............... 60/611, 60/600–603; *F02B 37/12, 37/16, 37/18, F02B 37/24*
See application file for complete search history.

(56) References Cited

U.S. PATENT DOCUMENTS

| | | | | |
|---|---|---|---|---|
| 2,559,623 A | | 7/1951 | Holmes ............... | 60/600 |
| 4,227,372 A | * | 10/1980 | Kakimoto et al. ........ | 60/611 |
| 4,282,713 A | | 8/1981 | Antoku et al. .......... | 60/600 |
| 5,724,813 A | * | 3/1998 | Fenelon et al. ......... | 60/611 |
| 6,381,961 B1 | * | 5/2002 | Bischoff ............... | 60/605.2 |
| 6,701,710 B1 | * | 3/2004 | Ahrens et al. .......... | 60/611 |
| 6,715,287 B1 | * | 4/2004 | Engel et al. ........... | 60/601 |
| 7,021,058 B2 | * | 4/2006 | Scheinert ............. | 60/611 |
| 7,254,948 B2 | * | 8/2007 | Gustafson et al. ....... | 60/611 |
| 7,281,378 B2 | * | 10/2007 | Gu et al. ............. | 60/599 |

(Continued)

FOREIGN PATENT DOCUMENTS

DE    28 23 067 A1    12/1978

(Continued)

OTHER PUBLICATIONS

"Die Bibliothek der Technik" ("Dictionary of Technical Science"), "Exhaust Gas Turbocharger", 2001, pp. 24-25, 46-47, vol. 103, Moderne Industrie Publishers, D-86898 Landsberg/Lech, Germany, ISBN 3-478-93263-7.

*Primary Examiner*—Thai-Ba Trieu
(74) *Attorney, Agent, or Firm*—Laurence A. Greenberg; Werner H. Stemer; Ralph E. Locher

(57) ABSTRACT

A method is introduced for controlling a turbocharger that generates a charging pressure in an intake plenum. The charging pressure is controlled on the turbine side, and the turbocharger has a circulating-air valve that temporarily opens a flow-cross section between the intake plenum and a suction side of the turbocharger when an air mass flow flowing out of the intake plenum is reduced. Under certain operating conditions, in addition to the turbine-side control by adjusting a turbine flow cross-section, the charging pressure is reduced by opening the circulating-air valve. Furthermore, a control device is introduced that implements the process.

10 Claims, 2 Drawing Sheets

U.S. PATENT DOCUMENTS

| | | |
|---|---|---|
| 2003/0115870 A1 | 6/2003 | Finger et al. .................. 60/611 |
| 2007/0039320 A1* | 2/2007 | Gu et al. ....................... 60/599 |
| 2008/0208432 A1* | 8/2008 | Hu ............................. 701/103 |

FOREIGN PATENT DOCUMENTS

| | | | |
|---|---|---|---|
| EP | 1 275 852 A2 | 1/2003 | |
| JP | 08061073 A | * | 3/1996 |
| WO | WO 98/44249 A1 | | 10/1998 |
| WO | WO 2004046519 A1 | * | 6/2004 |

\* cited by examiner

METHOD AND CONTROL DEVICE FOR CONTROLLING A TURBOCHARGER HAVING A TURBINE-SIDE CHARGING PRESSURE CONTROL AND A CIRCULATING-AIR VALVE

RELATED APPLICATIONS

This application claims priority to German Patent Application No. 10 2005 054 52.4, the disclosure of which is incorporated by reference herein in its entirety.

BACKGROUND AND SUMMARY OF THE INVENTION

The present invention relates to a method of controlling a turbocharger that generates a charging pressure in an intake plenum, the charging pressure being controlled on the turbine side. The turbocharger has a circulating-air valve that temporarily opens a flow cross-section between the intake plenum and a suction side of the turbocharger when an air mass flow flowing out of the intake plenum is reduced. The present invention also relates to a control device that controls the process sequence Turbochargers with one or more circulating-air valves are used in the case of Otto engines that are operated in a throttled manner at least in certain operating conditions. The throttling is achieved by a reduced opening cross-section of an air mass flow adjusting member between combustion chambers of the internal-combustion engine and the intake plenum. The position of a throttle valve or an opening lift of intake valves, for example, can be used as an adjusting variable.

In the case of a high air mass flow rate, as it occurs as a result of a high rotational engine speed and/or high values of the combustion chamber charge, a high rotational supercharger speed and a large charge air mass flow into the intake plenum become apparent. If the air mass flow adjusting member is rapidly closed from such an operating condition, the air mass flow flowing out of the intake plenum will decrease very fast. Because of the inertia of the charge air flow, without countermeasures, a pressure rise will occur in the intake plenum while the charge air mass flow decreases. In this case, the flow may detach from the compressor blades and allow the air to flow back through the compressor to cause the pressure to fall.

Since, because of the high rotational energy, the rotational speed of the compressor impeller adapts only slowly to the reduced charge air demand, the flow direction reverses again after the adjustment of corresponding pressure conditions over the compressor. The process is repeated in quick succession. Because of the resulting sound, the periodic repetition of this process is also called "surging". In order to avoid this surging, which is disadvantageous for the service life of the compressor impeller and for the noise comfort, the intake plenum is relieved by a temporary opening of the circulating-air valve to the suction side of the turbocharger.

A method of the initially mentioned type operating by way of such a circulating-air valve is known from the series "Die Bibliothek der Technik" ("Dictionary of Technical Science") Volume 103, "Exhaust Gas Turbocharger", Moderne Industrie Publishers, D-86896 Landsberg/Lech, ISBN 3-478-93263-7, Page 47. From page 24 of the same publication, recirculation ducts are known that return a portion of the air already entered into the compressor back into the main flow in front of the compressor. As a result, the surge limit of the compressor is to be displaced to smaller volume flow rates. This results in an enlargement of the useful area of the characteristic compressor diagram. EP 1 275 852 A2 shows what is also known as characteristic diagram stabilization, and reveals a controllable bypass to the compressor impeller. The bypass is to be closed as a rule and is to be opened in the following three cases:

In the case of a charging pressure increase from an operating point at a low load, the opened bypass should allow a higher rotational compressor speed.

An opening at the surge limit of the compressor should result in an expansion of the characteristic diagram as a result of a recirculation flow; particularly after a full-load acceleration with a subsequent abrupt release of the accelerator, the surging of the compressor is to be prevented.

By controlling the bypass cross-section, a load control is to take place as an alternative or in addition to a throttle valve control.

Up to now, the turbine-side control of the charging pressure in the case of Otto engines has taken place by a flap in a bypass duct by which exhaust gas was guided past the turbine as required. In diesel engines, turbochargers are also used where the turbine-side control of the charging pressure takes place by way of an adjustable turbine geometry. All exhaust gas will then flow by way of the turbine that permits a utilization of a larger portion of the exhaust gas energy and on optimized adjustment of the turbine flow cross-section for each operating point. In contrast to the bypass control, a higher efficiency of the turbocharger is achieved as a desirable consequence and thus also a higher efficiency of the internal-combustion engine. As a rule, diesel engines are operated in an unthrottled manner with a high excess of air. As a result, the described surging does not occur there.

In the future, turbochargers with a controllable turbine flow cross-section are to be used also in Otto engines. At a certain turbine flow cross-section, generally at a maximal turbine flow cross-section, such a turbocharger generates a minimal charging pressure, which in the following will be called a basic charging pressure. The basic charging pressure represents the minimal charging pressure that the turbocharger can provide in the case of the given exhaust gas mass flow.

Because turbochargers are generally designed such that they provide as much charging pressure as possible in the lowest rotational engine speed range while the exhaust gas mass flow rate is low, a high value for the basic charging pressure will necessarily be obtained at larger exhaust gas mass flows, thus at higher rotational engine speeds and/or combustion chamber charges.

There are circumstances in which the charging pressure has to be lowered in order to protect components of the internal-combustion engine from damage. Poor fuel quality can be mentioned here as an example and this leads to a knocking engine operation. The knocking tendency can be reduced by, among other things, the reduction of the charging pressure. A high basic charging pressure is therefore disadvantageous under these circumstances. In such cases, the limiting of the charging pressure could take place by triggering a turbine bypass flap. The disadvantage of this solution consists of the fact that, for special cases in which the basic charging pressure is too high, another adjusting member has to be provided for the turbine-side adjustment of the charging pressure with the resulting disadvantages with respect to space, weight and costs.

In view of this background, an object of the present invention is to provide a control of a turbocharger with an improved engine efficiency that avoids the above-mentioned disadvantages with a solution involving an additional adjusting member for a turbine-side controlling of the charging pressure.

In a method of the initially mentioned type, this object has been achieved in that, under certain operating conditions, in addition to the turbine-side control, which takes place by adjusting a turbine flow cross-section, the charging pressure is reduced by opening the circulating-air valve. The control device achieves the object in that it controls the course of the process.

By using the circulating-air valve, already present on the compressor side for reducing the charging pressure in the intake plenum in certain operating conditions, the charging pressure can be reduced there to values below the basic charging pressure of the turbine. This permits the use of a turbocharger with an adjustable flow cross-section and leads to the desired improvement of the efficiency. In this case, the circulating-air valve as a whole is used multiple times additionally to its known function for preventing the surging. This multiple utilization can eliminate an additional turbine-side adjusting member. The disadvantages connected by way of such an adjusting member are thereby completely avoided.

BRIEF DESCRIPTION OF THE DRAWINGS

Other objects, advantages and novel features of the present invention will become apparent from the following detailed description of the invention when considered in conjunction with the accompanying drawings, in which.

DETAILED DESCRIPTION OF THE DRAWINGS

Figure 1:
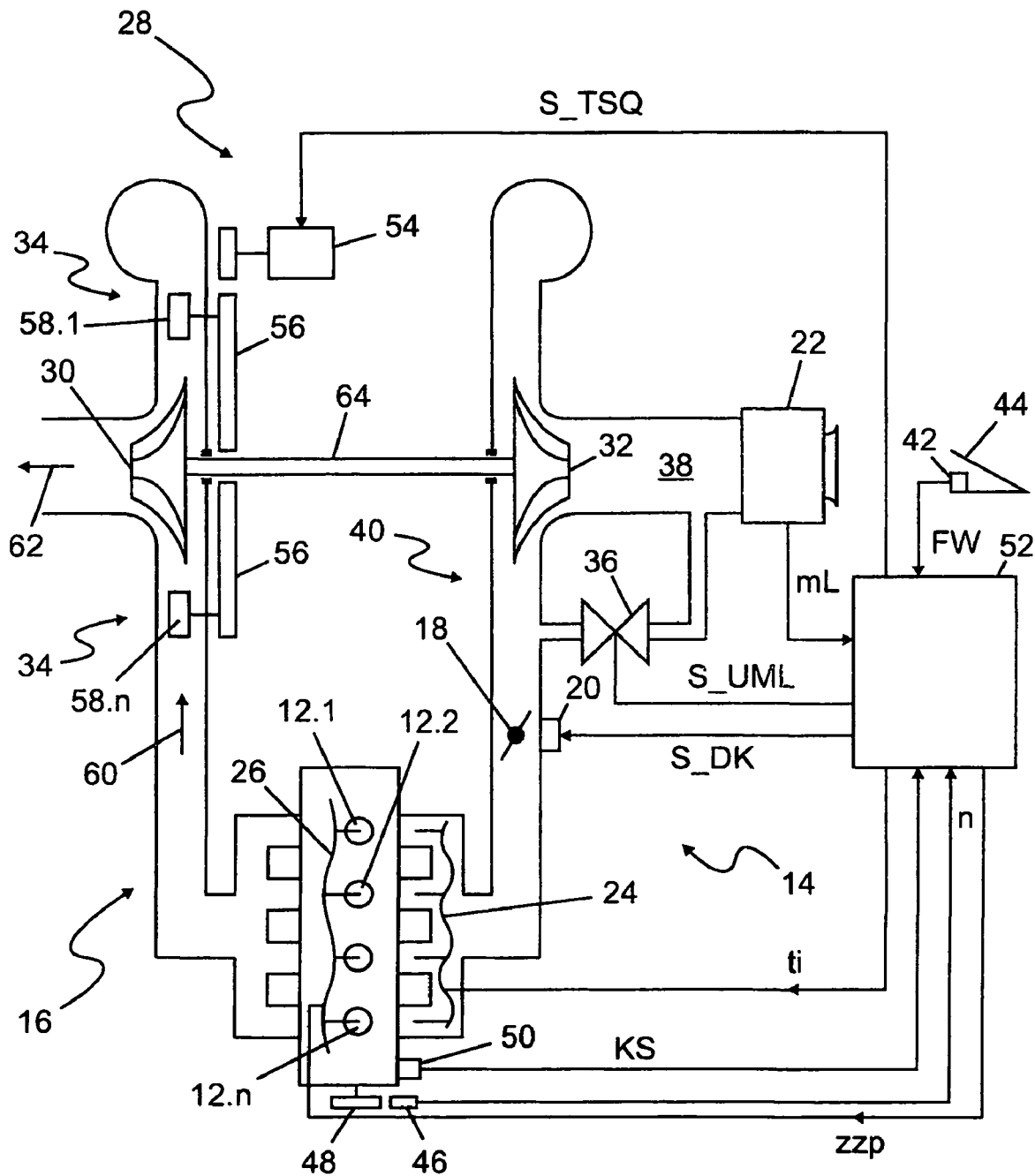
FIG. 1 is a schematic view of an internal-combustion engine having a turbocharger.

Specifically, FIG. 1 shows an internal-combustion engine 10 having combustion chambers 12.1, 12.2, ..., 12.n that are charged with air or a fuel-air mixture from an intake system 14 and whose exhaust gases are discharged by way of an exhaust system 16.

The quantity of the inflowing air or of the inflowing mixture is adjusted by way of a charge adjusting member represented in FIG. 1 by a throttle valve 18 with a pertaining throttle adjusting device 20. A charge sensor 22 implemented, for example, as an air mass meter or as a suction pipe pressure sensor detects the quantity mL of the air flowing into the combustion chambers 12.1, ..., 12.n.

Fuel is apportioned to the air by an injector arrangement 24. The apportioning taking place either in the intake system 14 (suction pipe injection) or by a direct injection of fuel into the combustion chambers 12.1., ... 12.n (direct injection). A spark plug arrangement 26 is used for igniting the combustion chamber charges.

The internal-combustion engine 10 illustrated in FIG. 1 has an exhaust gas turbocharger 28 whose turbine wheel 30 is driven by the expelled exhaust gases and which, in turn, drives a compressor impeller 32 in the intake system 14. The exhaust gas turbocharger 28 also has a controllable turbine opening cross-section 34. On the compressor side of the turbocharger 28, a controllable circulating-air valve 36 is situated between a suction side 38 of the turbocharger 18 and an intake plenum 40, in which a charging pressure p_charge is set.

A driver's torque demands FW are detected by a driver's intention generator 42 that detects the position of an accelerator pedal 44 of a motor vehicle driven by the internal-combustion engine 10. An angle-of-rotation sensor 46 traces the angle datum marks of a generator wheel 48 non-rotatably connected with a crankshaft of the internal-combustion engine 10 and thereby supplies information on the angular position and the angular velocity of the crankshaft that corresponds to the rotational engine speed.

It is to be understood, of course, that a larger number of additional sensors may be present for controlling and/or regulating the internal-combustion engine 10 in the case of modern motor vehicles. These sensors detect the pressures, temperatures, angular positions of camshafts and/or additional operating parameters of the internal-combustion engine 10. The present invention is, therefore, not limited to a use with an internal-combustion engine 10 that only has the above-mentioned sensors 22, 42, 46. A sensor system 50 is therefore particularly advantageous whose signals permit an evaluation of the combustions of the combustion chamber charges.

In one embodiment, the sensor system 50 consists of one or more structure-borne noise sensors. Anomalies, such as knocking combustions, are imaged in the signals KS of the structure-borne noise sensors. As an alternative or in addition, the sensor system 50 may also consist of one or more combustion chamber pressure sensors. As a further alternative or in addition, combustion characteristics may also be determined from high-resolution signal strings of the angle-of-rotation sensor 46.

For controlling the internal-combustion engine 10, the signals of the charge sensor 22, of the driver's intention generator 42, of the angle-of-rotation sensor 46, of the sensor system 50 and, as required, the signals of alternative or additional sensors are processed by an engine control device that generates adjusting signals therefrom for controlling functions of the internal-combustion engine 10. For this purpose, the control device 52 particularly has at least one processor and one memory, and is programmed for controlling the processes introduced here. In the not final representation of FIG. 1, the adjusting signals are ignition signals zzp for controlling the ignitions, injection pulse widths ti for controlling the start and the duration of injections of fuel, an adjusting signal S_DK for controlling the throttle valve 18, an adjusting signal S-uml for controlling the circulating-air valve 36 and an adjusting signal S_TSQ for controlling the turbine flow cross-section 34.

In one embodiment, the controlling of the turbine flow cross-section 34 takes place by triggering an electric stepping motor 54 by way of the adjusting signal S_TSQ. The stepping motor 54 controls an angular position of an adjusting ring 56 so as to move the guide blades 58.1, 58.n. The position of the guide blades 58.1, 58.n distributed circularly along the adjusting ring in a ring-shaped cross-section defines the turbine flow cross-section 34. The definition of the turbine flow cross-section 34 by the guide blades 58.1, 58.n comprises defining the cross-sectional surface and the alignment of the cross-sectional surface relative to the turbine wheel 30.

The exhaust gas flows against the turbine wheel 30 from a direction and at a velocity that are defined by the position of the adjustable guide blades 58.1, 58.n. The exhaust gas entering into the turbine wheel 30 first has a centripetal component 60 of its flow direction and leaves the turbine wheel 30 in the axial direction 62. The kinetic exhaust gas energy transmitted thereby to the turbine wheel 30 drives the compressor impeller 32 by way of the shaft 64. In the closed guide blade position, large tangential components of the flow velocity and a high enthalpy gradient over the turbine wheel 30 lead to a high turbine output and therefore to a high charging pressure p_lade (p_charge). In the fully open position of the guide blades 58.1, ..., 58.n, ..., the maximal exhaust gas mass flow rate through the turbine occurs at a high centripetal fraction of the velocity vector of the flow at a smaller enthalpy gradient, so that the basic charging pressure is set in this position.

Figure 2:
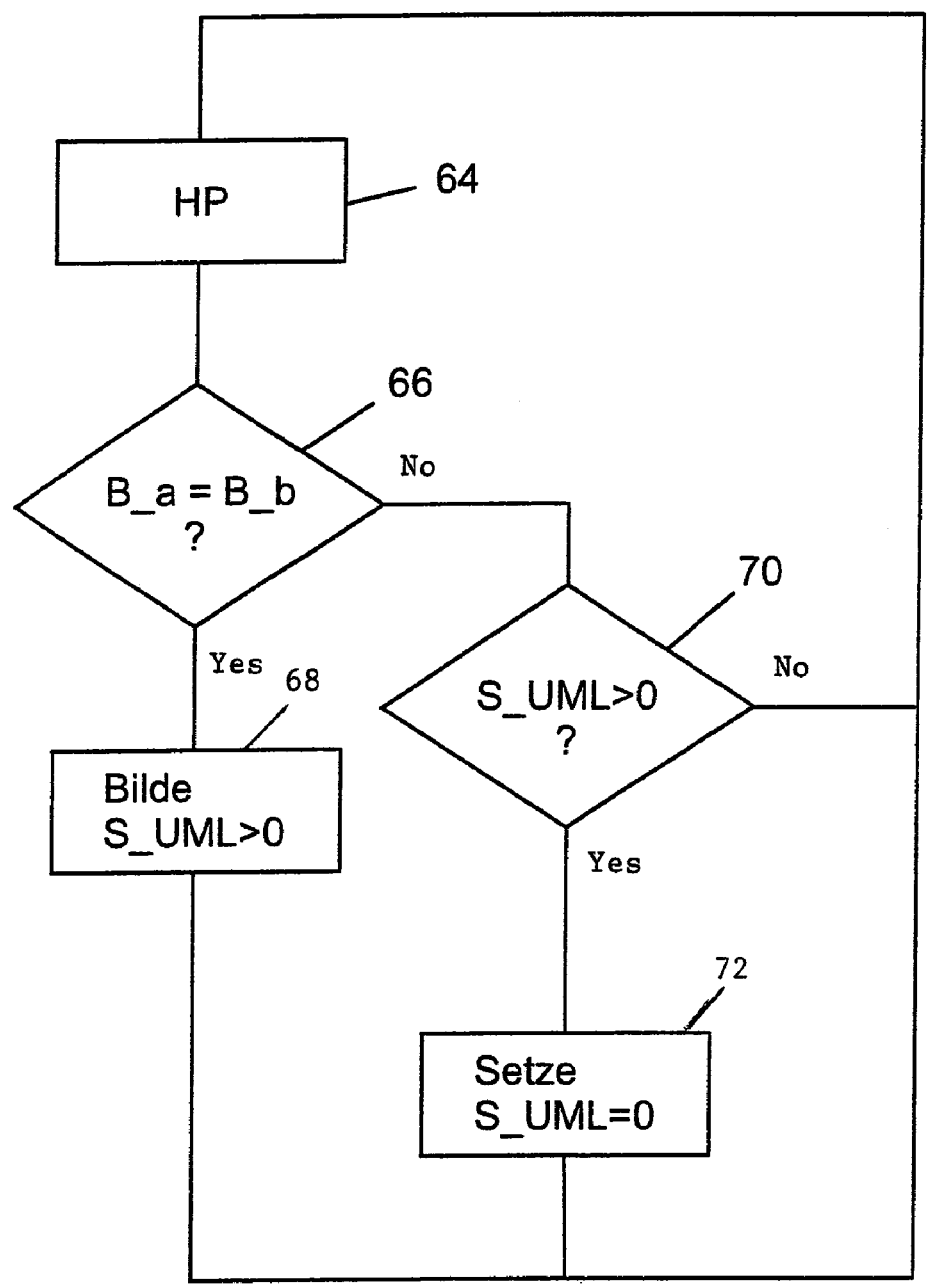
FIG. 2 is a flow chart as an embodiment of the method according to the invention.

FIG. 2 is a flow chart showing an embodiment of a method according to the invention. Step 64 represents a main program HP for controlling the internal-combustion engine 10 by forming the control variables ti, zzp, KS, S_UML and S_TSQ as a function of operating conditions that are characterized by the torque demand, the rotational speed, an occurrence of knocking and/or raised temperatures and, as required, additional operating parameters.

In a Step 66, it is checked whether the current operating condition B_a is one of the defined operating conditions B_b in which the charging pressure, in addition to the turbine-side controlling by the adjusting signal S_TSQ, is to be reduced by opening the circulating-air valve by means of the adjusting signal S_UML.

If the answer to the query in Step 66 is yes, the program first branches into Step 68, in which the adjusting signal S_UML>0 for opening the circulating-air valve 36 is generated and emitted. This may be a binary on/off signal or a continuously variable pulse duty ratio, by which the circulating-air valve 36 is triggered in an opening manner. Subsequently, while the circulating-air valve 36 is open, the program returns to the main program in Step 64.

If, in contrast, the answer to the query in Step 66 is no, a query 70 will follow in which it is checked whether the circulating-air valve 36 is triggered by way of an adjusting signal S_UML>0 in an opening manner. If this is so, the circulating-air valve 36 is closed by resetting the adjusting signal S_UML in Step 72, and subsequently a return takes place to the main program in Step 64. If the adjusting signal S_UML has already been equal to 0, the program returns from Step 70 directly into the main program in Step 64.

In one embodiment, the defined operating condition B_b is present if a desired value for the charging pressure p_charge is below a basic charging pressure of the exhaust gas turbocharger 28. Under certain circumstances, such a desired value is formed in order to protect components of the internal-combustion engine 10 or of the exhaust gas turbocharger from being damaged by knocking combustions and/or excessively high temperatures.

In an alternative embodiment, the defined operating condition will already exist if a desired value for the charging pressure is within a given bandwidth around about the basic charging pressure. This has the advantage that the circulating-air valve 10 is opened early, so that a certain control bandwidth still remains for interventions in the variable turbine opening cross-section by way of the adjusting signal TSQ.

The defined operating condition B_b may, in particular, be a stationary operating condition, which is recognized in that an exhaust gas mass flow rate of the internal-combustion engine exceeds a predetermined threshold value. As an alternative or in addition, the defined operating condition B_b may be characterized by high values of the rotational engine speed n and the charging of combustion chambers 12.1, 12.2, . . . , 12.n of the internal-combustion engine and may be detected by corresponding threshold value comparisons.

In the case of internal-combustion engines having several turbochargers with an adjustable turbine geometry, the method and/or one or more of its embodiments is or are correspondingly applied to one or more turbochargers.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for controlling a turbocharger that generates a turbine-side controlled charging pressure in an intake plenum, and has a circulating-air valve which temporarily opens a flow-cross section between the intake plenum and a suction side of the turbocharger when an air mass flow flowing out of the intake plenum is reduced, comprising
adjusting a turbine flow cross-section for turbine side control, and under a defined operating condition, reducing the charging pressure by opening the circulating-air valve, wherein the defined operating condition is an exhaust gas mass flow rate through the turbocharger exceeding a predetermined threshold value.

2. The method according to claim 1, wherein the defined operating condition is a desired value for the charging pressure being below a basic charging pressure of the turbocharger.

3. The method according to claim 1, wherein the defined operating condition is a stationary operating condition.

4. The method according to claim 1, wherein the defined operation condition is a desired value for the charging pressure being within a given bandwidth around about the basic charging pressure.

5. The method according to claim 1, wherein the defined operating condition is an operating condition with a high rotational engine speed and high values for charges of combustion chambers.

6. A Control device for controlling a turbocharger that generates a turbine-side controlled charging pressure in an intake plenum that has a circulating-air valve which temporarily opens a flow cross-section between the intake plenum and a suction side of the turbocharger when an air mass flow flowing out of the intake plenum is reduced, comprising
means for reducing under at least one defined operating condition and in addition to the turbine-side control by adjusting a turbine flow cross-section, the charging pressure by opening the circulating air valve, wherein the defined operating condition is an exhaust gas mass flow rate through the turbocharger exceeding a predetermined threshold value.

7. The control device according to claim 6, wherein the defined operating condition is a desired value for the charging pressure being below a basic charging pressure of the turbocharger.

8. The control device according to claim 6, wherein the defined operating condition is a stationary operating condition.

9. The control device according to claim 6, wherein the defined operation condition is a desired value for the charging pressure being within a given bandwidth around about the basic charging pressure.

10. The control device according to claim 6, wherein the defined operating condition is an operating condition with a high rotational engine speed and high values for charges of combustion chambers.

* * * * *